Sept. 11, 1962
R. J. DONKER
3,054,054
ELECTRICAL GAUGE
Filed April 20, 1959
2 Sheets-Sheet 1
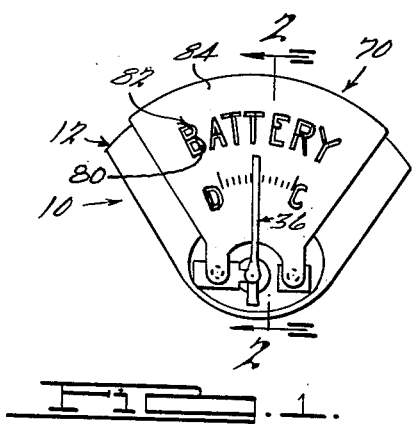
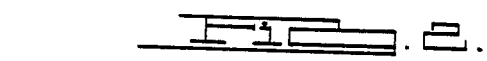
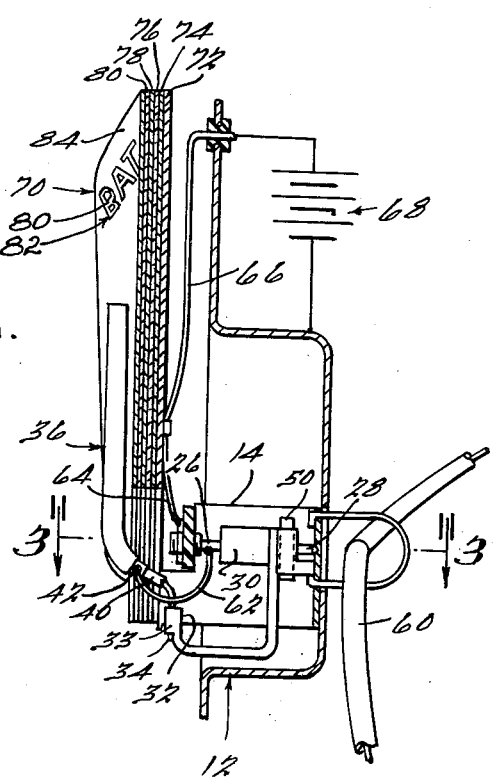
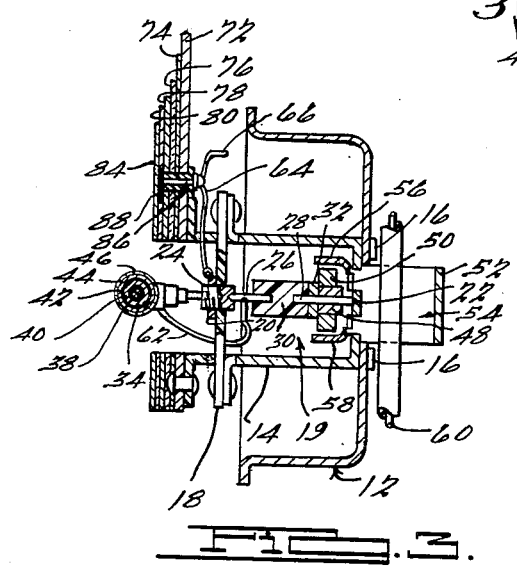
INVENTOR.
Robert J. Donker.
BY Harness and Harris
ATTORNEYS.

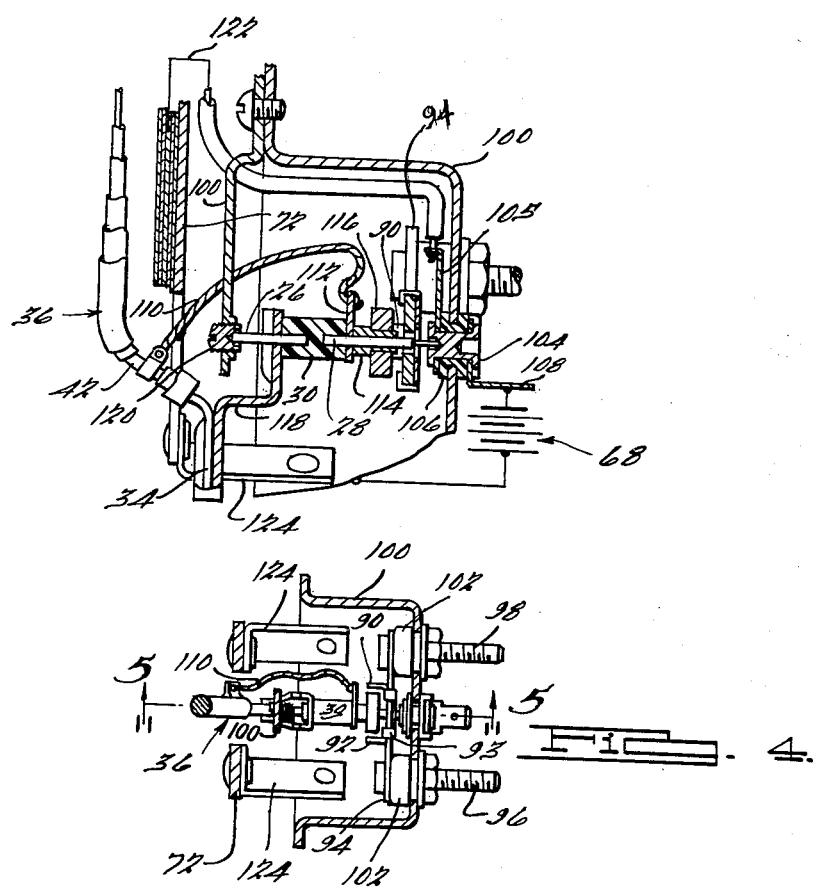

United States Patent Office 3,054,054
Patented Sept. 11, 1962

3,054,054
ELECTRICAL GAUGE
Robert J. Donker, Detroit, Mich., assignor to Chrysler Corporation, Highland Park, Mich., a corporation of Delaware
Filed Apr. 20, 1959, Ser. No. 807,380
3 Claims. (Cl. 324—155)

This invention relates to electrical gauges which utilize induced magnetic fields to rotate an indicator or pointer to show the direction and/or magnitude of the current or the voltage. More specifically this invention relates to gauges of the aforementioned type incorporating therein electroluminescent lighting structure.

In current indicating devices of the type employed to indicate the current and/or voltage in automotive electrical systems it is necessary to provide a substantially frictionless moving pointer to be sufficiently sensitive to current to record and indicate very small current flow. Should it be necessary to attach in any way an electrical conductor to make the electroluminescent on panelescent lighting structure operative, this conductor must be so placed that it does not act in torsion to inhibit rotative movement of the electroluminescent pointer. Various types of current indicating devices theretofore developed which have used electroluminescent lighting have not been found entirely successful in that their sensitivity to minute current flow is reduced by the pointer movement inhibiting characteristics of the connections made from the power source to the electroluminescent pointer and face plate conductors or condenser like plates.

It is therefore a principal object of this invention to provide a pivotal mounting structure and electrical conductor system for the electroluminescent pointer and face plate of a current indicator which structure cooperates in a substantially non-frictionless manner to provide current to the plates of the pointer and/or face plate thereof and at the same time to allow free movement of the pointer.

A specific object of this invention is to provide a supporting shaft for the electroluminescent pointer which shaft is comprised of electrical insulating means provided with bearing structure at each end thereof through which electrical current can pass to the conductors of the electroluminescent pointer.

Further objects and advantages of the present invention will become apparent from the following description and drawings, in which:

FIGURE 1 represents a top elevational view of a battery charging indicator;

FIGURE 2 represents a cross sectional view of the device of FIGURE 1 taken along the line 2—2 thereof in the direction of the arrows;

FIGURE 3 represents a cross sectional view of the device of FIGURE 2 taken along the line 3—3 thereof in the direction of the arrows;

FIGURE 4 is a cross sectional view of a variation of the device of FIGURE 1; and FIGURE 5 represents a partial cross sectional view of the device of FIGURE 4 taken along the line 5—5 thereof in the direction of the arrows.

Referring to the drawings and in particular to FIGURES 1, 2, and 3, an electrical current measuring and indicating device designated 10 is comprised of a housing 12 supporting a pointer support bracket 14 secured to housing 12 by means of tabs 16 integral with bracket 14 and inserted through slots in the bottom of housing 12 and bent over. An upper bearing support 18 is secured to the bracket 14 and is provided with a nut 20 secured thereon by adhesion or by integral molding with the upper bearing support 18 which is of electrically insulative material such as plastic. The bottom of bracket 14 is provided with a lower bearing recess 22, and an adjustable upper bearing 24 is threadedly received into nut 20 and passes completely through the support 18 to be properly positioned with respect to a shaft 19 comprised of an upper bearing tip 26, a lower bearing tip 28, and an intermediate insulating rod 30, which electrically insulates tips 26 and 28. Adjustable upper bearing 24 can be screwed into nut 20 a sufficient distance to place the proper amount of pressure on the tips 26 and 28 to allow substantially non-frictional movement of the shaft 19. Secured to this shaft is an electrically conductive pointer support 32 which curves upwardly and is clamped or otherwise secured at 33 onto a wire conductor 34 which forms the inner plate of the electroluminescent pointer 36. This pointer 36 is comprised of the inner conductor 34 coated by successive layers of a porcelain insulating material 38, an electroluminescent dielectric material 40, a transparent metal conductor 42, a glass protective coat 44, and a red fluorescent paint 46. This structure of the pointer is typical of electroluminescent or Panelescent® lighting structures and is described in the Sylvania Electric Engineering Bulletin entitled Panelescent® Lamps number 0–194, dated Sept. 1, 1958, issued by Commercial Engineering Department, Sylvania Electric Products Inc., Salem Massachusetts, and in the Patent No. 2,838,715 to E. C. Payne, issued June 10, 1958. As described by the Payne patent it is possible to provide a suitable electroluminescent lamp with only the two conductor plates and the separating phosphor dielectric layer therebetween.

Secured to the shaft 19 is a bushing 48 and a permanent magnet 50 force fitted onto the bushing 48. This magnet 50 is conveniently made in a substantially round shape and is imparted with a definite and non-changeable polarity. Secured to the housing 12 and projecting through support 14 is an electromagnetic core 52 which comprises a loop 54 and two pole pieces 56 and 58. These pole pieces are spaced the proper distance from the periphery of the magnet 50 and have no polarity at zero current in the conductor 60. As current passes through conductor 60 in either direction the induced polarity of pole pieces 56 and 58 will become opposite to each other and will depend upon the direction of current flow in the conductor 60. As the magnetic field is built up in pole pieces 56 and 58, movement of the magnet 50 by the cooperating phenomena of repulsion and attraction will rotate the shaft 19 and move the pointer 36 to indicate the direction and amount of current flowing in the conductor 60. The Panelescent® structure of the pointer mentioned above is desirable in that a proper reading of the device can be made at night without the aid of artificial lighting other than the Panelescent® lighting itself.

In order to charge the conductors or condenser plates 34 and 42 of the pointer 36 a conductor 62 is secured at one end to the upper bearing tip 26 by any suitable means such as welding, brazing or soldering, and the other end of conductor 62 is secured to the outer condenser plate or conductor 42 of the pointer. The inner conductor or condenser plate 34 of the pointer is connected to the housing 12 through the pointer support 32 and lower bearing tip 28. The upper bearing tip 26 is connected through conductors 64 and 66 to one terminal of the power supply 68 while the opposite terminal of this power supply is connected to the housing 12. This electrical circuitry operatively completes a condenser system utilizing the electroluminescent material 40 as the main dielectric thereof. The voltage across this condenser excites the electroluminescent dielectric 40 to emit light which is communicated to the observer through the fluorescent paint 46 coating the exterior of the pointer. Power supply 68 is separate from the power source of conductor 60 and is usually of a very low D.C. voltage. Cooperating with pointer 36 to give a more readily readable current flow indication is a face plate 70 comprising a lower condenser plate 72, an insulating porcelain layer 74, an electroluminescent paint or layer 76, a transparent electrically conductive layer or condenser plate 78, and a protective glass coat 80.

In order to define numerals or letters such as shown in FIGURE 1, a masking layer 84 is provided and lies on top of the protective coat 80 to cover specific portions of the face plate to define the letters or numerals 82 thereon.

The electrical connections to the condenser plates 72 and 78 are readily made through an insulated connector pin 86 and an electrically conductive tab 88 which bears against the condenser plate 78. The condenser plate 72 is connected to the power supply 68 through the support 14 and housing 12. It is readily seen that the electrical connections of these condenser plates of both the pointer and the face plate are not made through any conductor which may exert any torsional hindrance to the movement of the pointer but are made directly through the bearing tips 26 and 28 and the bearings 22 and 24.

In the variation of the device shown in FIGURES 4 and 5, the sole pieces 90 and 92 are magnetized directly by the passage of current through the pole support 94 to which the pole pieces 90 and 92 are attached by tabs 93. This pole support 94 is electrically connected to studs 96 and 98 which pass through metal housing 100 and are insulated therefrom by insulating washers 102. Studs 96 and 98 are connected into the circuit the current of which is to be measured by the device. The lower bearing tip 28 in this variation is shown to pass through the pole support 94 and be pivotally mounted in a lower bearing stud 104 which is insulated from the housing 100 by a bushing 106. A connector terminal 108 is secured to the stud 104 and is electrically connected to one terminal of the power supply 68. The outer condenser plate 42 of the pointer is secured to the lower bearing tip 28 through a conductor 110 and a connecting tab 112 secured to a bushing 114 which is pressed into the permanent magnet 116 and frictionally secured to tip 28. In this manner an electrical connection is made from the condenser plate 42 through to one terminal of the power supply 68. The inner conductor or condenser plate 34 of the pointer is secured to the other terminal of the power supply through the upper bearing tip 26, supporting arm 118, adjustable upper bearing 120 and housing 100. The condenser plate 78 of the face plate 70 is secured through a conductor 122 to the stud 104 by tab 105 and hence to one terminal of the power supply 68. The other plate 72 of the face plate is connected through the face plate supporting brackets 124 to the housing 100 and hence to the other terminal of the power supply.

It is seen that current flow through the pole support 94 will magnetize pole pieces 92 and 90 to a certain polarization which will be reversed upon reversal of the direction of the current flow. In the same manner as in the device of FIGURES 1–3, the pointer 36 will move to indicate the direction and degree of current flow in the exterior circuit. It is again noted that the electrical connections to the condenser plates of the pointer are made through electrically conductive bearings which support the pointer, and in this manner substantially frictionless movement of the pointer and a high degree of sensitivity of the device may be obtained.

I claim:
1. In an electrical current measuring device, electromagnetic means adapted to become polarized in response to current flow therein, current indicator means responsive to said polarization to indicate the direction and magnitude of said current flow, said indicator means comprising an electroluminescent structure having electrodes spaced by electroluminescent dielectric material, a supporting shaft of electrically insulative material having an electrically conductive bearing tip secured to each end thereof, said electrodes being operatively connected to different ones of said tips, and electrically conductive bearing means rotatably supporting said tips, each of said bearing means being adapted for connection to opposite terminals of an electrical power supply for subjecting said dielectric material to an electrostatic field.

2. In an electrical current measuring device, electromagnetic means adapted to become polarized in response to current flow therein, said polarity depending on the direction of said current flow, indicator means for indicating the direction and magnitude of said current flow, said indicator means comprising an electroluminescent structure having electrodes separated by electroluminescent dielectric material, a supporting shaft for said indicator means of electrically insulative material having an electrically conductive bearing tip secured to each end thereof, said electrodes being operatively connected to a different one of said tips, electrically conductive bearing means supporting said tips, each of said bearing means being adapted for connection to opposite terminals of an electrical power supply, and permanent magnet means on said shaft and responsive to said polarization to rotate said shaft.

3. In an electrical current measuring device, electromagnetic means adapted to become polarized in response to current flow therein, indicator means responsive to said polarization for indicating the direction and magnitude of said current flow comprising a pointer having electrodes separated by electroluminescent dielectric material, a supporting shaft for said pointer of electrically insulative material having an electrically conductive bearing tip extending from each end thereof, said electrodes of said pointer being electrically connected to respective ones of said bearing tips, electrically conductive bearing means pivotally supporting each of said bearing tips and making electrical contact therewith, each of said bearing means being adapted for connection to opposite terminals of an electrical power supply, magnetic means carried by said supporting shaft and responsive to said polarization of said electromagnetic means to move said supporting shaft and associated pointer, an electroluminescent face plate positioned adjacent said pointer, said face plate having electrodes separated by electroluminescent dielectric material, said face plate electrodes being electrically connected to respective ones of said bearing means, and current intensity markings on said face plate cooperating with said pointer to give a visual reading.

References Cited in the file of this patent
UNITED STATES PATENTS

| | | |
|---|---|---|
| 1,686,645 | Todd | Oct. 9, 1928 |
| 1,754,085 | Faus | Apr. 8, 1930 |
| 2,867,768 | Fribance | Jan. 6, 1959 |
| 2,945,145 | Neugass | July 12, 1960 |